439-404 AJ 322 991
6/16/87 OR RE 32,439

United States Patent [19]

Narozny

[11] E Patent Number: Re. 32,439

[45] Reissued Date of Patent: Jun. 16, 1987

[54] THREE-ROW CONNECTOR FOR MASS TERMINATING FLAT CABLE

[75] Inventor: Ronald S. Narozny, Panorama City, Calif.

[73] Assignee: Thomas & Betts Corporation, Raritan, N.J.

[21] Appl. No.: 665,828

[22] Filed: Oct. 29, 1984

Related U.S. Patent Documents

Reissue of:

[64] Patent No.: 4,437,723
Issued: Mar. 20, 1984
Appl. No.: 221,396
Filed: Dec. 30, 1980

[51] Int. Cl.[4] ..... H01R 4/24
[52] U.S. Cl. ..... 439/404
[58] Field of Search ..... 339/17 F, 97 R, 97 P, 339/98, 99 R, 176 MF

[56] References Cited

U.S. PATENT DOCUMENTS

| | | | |
|---|---|---|---|
| 3,189,863 | 6/1965 | Leach | 339/99 |
| 3,408,616 | 10/1968 | Greenbaum | 339/99 |
| 3,444,506 | 5/1969 | Wedekind | 339/99 |
| 3,582,867 | 6/1971 | Thompson | 339/92 M |
| 3,731,254 | 5/1973 | Key | 339/17 |
| 3,816,819 | 6/1974 | Judd | 339/99 |
| 3,820,055 | 6/1974 | Huffnagle et al. | 339/17 |
| 3,930,708 | 1/1976 | Wedekind et al. | 339/99 R |
| 3,990,767 | 11/1976 | Narozny | 339/198 |
| 4,025,141 | 5/1977 | Thelissen | 339/99 R |
| 4,099,822 | 7/1978 | Carlisle et al. | 339/98 |
| 4,101,189 | 7/1978 | Moser et al. | 339/99 R |
| 4,106,838 | 8/1978 | Jayne et al. | 339/99 R |
| 4,143,935 | 3/1979 | Goodman et al. | 339/99 R |
| 4,147,399 | 4/1979 | Moser et al. | 339/99 |
| 4,153,325 | 5/1979 | Asick | 339/99 R |
| 4,190,952 | 3/1980 | Thomas et al. | 339/99 R X |

FOREIGN PATENT DOCUMENTS 2620267 10/1977 Fed. Rep. of Germany .

OTHER PUBLICATIONS

Thomas & Betts Corporation Catalog, entitled "T&B/Ansley Blue Macs" pp. 61-67, Nov. 1978.
Drawing Nos. C1678-25 entitled "Contact Frame, Formed Male", Aug. 9, 1979.
Cannon ITT Brochure, entitled "Mas/Ter-IDC" Dec. 1979.

*Primary Examiner*—Joseph H. McGlynn
*Attorney, Agent, or Firm*—Robert M. Rodrick; Salvatore J. Abbruzzese

[57] ABSTRACT

A three-row, fifty-position D-connector for mass termination of flat multiconductor cable includes contact elements having insulation-piercing end portions in longitudinally singular locations and terminal end portions conforming in position to the industry-dedicated D-pattern. A method for making the connector provides for deriving diverse contact element sets from a common contact element strip configuration.

20 Claims, 14 Drawing Figures

THREE-ROW CONNECTOR FOR MASS TERMINATING FLAT CABLE

Matter enclosed in heavy brackets [ ] appears in the original patent but forms no part of this reissue specification; matter printed in italics indicates the additions made by reissue.

FIELD OF THE INVENTION

This invention relates to electrical connectors and pertains particularly to connectors adapted for mass-termination of flat multiconductor cables.

BACKGROUND OF THE INVENTION

Recent years have seen continually increasing use, in the electronics industry, of flat multiconductor cable and mass-termination thereof by connectors having terminal pin layout dedicated by the industry at different pitch, i.e., pin spacing, than the pitch dedicated by some cable manufacturers. In early years, the disparity between such pitches was accommodated by so-called "discrete" wiring, wherein the cable conductor ends were bared and brought out for individual solder or wire-wrap connection to connector terminal posts arranged in the pattern of the dedicated pin layout. More recently, advantageous mass-termination of such cable by insulation piercing has been accommodated. In one type of such recent effort, contact elements are preformed, by stamping or the like, to provide transition between the diverse pitches. In another recent prior art effort, contact elements include a bendable central section between an insulation-piercing contact and a terminal pin or socket, whereby the contact elements may be bent into such individual transition character as required.

Presently known efforts providing the advantages of mass-termination of flat cable to users of connectors having diverse pitch in pin layout continue not to serve the users of fifty-position, three-row pin layout connectors. Thus, such users remain involved in the discrete wiring approach and must bare conductors of flat cable and make individual connection to connector posts.

SUMMARY OF THE INVENTION

It is an object of the present invention to provide electrical connectors of type extending mass-terminating capability to pin layout arrangements not presently mass-terminatable.

It is a more particular object of the invention to provide an insulation-piercing electrical connector adapted for the mass-termination of fifty conductor flat cable to three-row fifty pin layouts.

It is a further object of the invention to provide improved methods for making electrical connectors.

In attaining the foregoing and other objects, the invention provides an elongate electrical connector having contact elements supported therein in three rows for mass-termination through insulation-piercing connection. The contact elements of connectors according with the invention include opposed first and second contact end portions, respectively of insulation-piercing type and pin/socket type. The contact elements are arranged in laterally opposed (first and third row) sets, wherein second end portions of each set are disposed in longitudinally registered pairs, such pairs being mutually longitudinally spaced per the above-noted dedicated pin layout, and wherein the first end portions are all in different longitudinal positions. A further contact element (second row) set laterally intervenes the first and third row sets and the first and second contact end portions thereof are in different longitudinal position from those of the first and third row sets. As is developed further below, the first and third row contact element sets are in respective mirror-image configuration longitudinally of the connector. The second row set is in further different configuration longitudinally of the connector.

In its method aspect, the invention enables the use of a commonly-configured contact element set to provide each of the differently configured contact row sets.

The foregoing and other objects and features of the invention will be further understood from the following detailed description of preferred embodiments of the invention and from the drawings thereof wherein like reference numerals identify like parts throughout.

DESCRIPTION OF THE PREFERRED EMBODIMENTS AND PRACTICE

Figure 1:
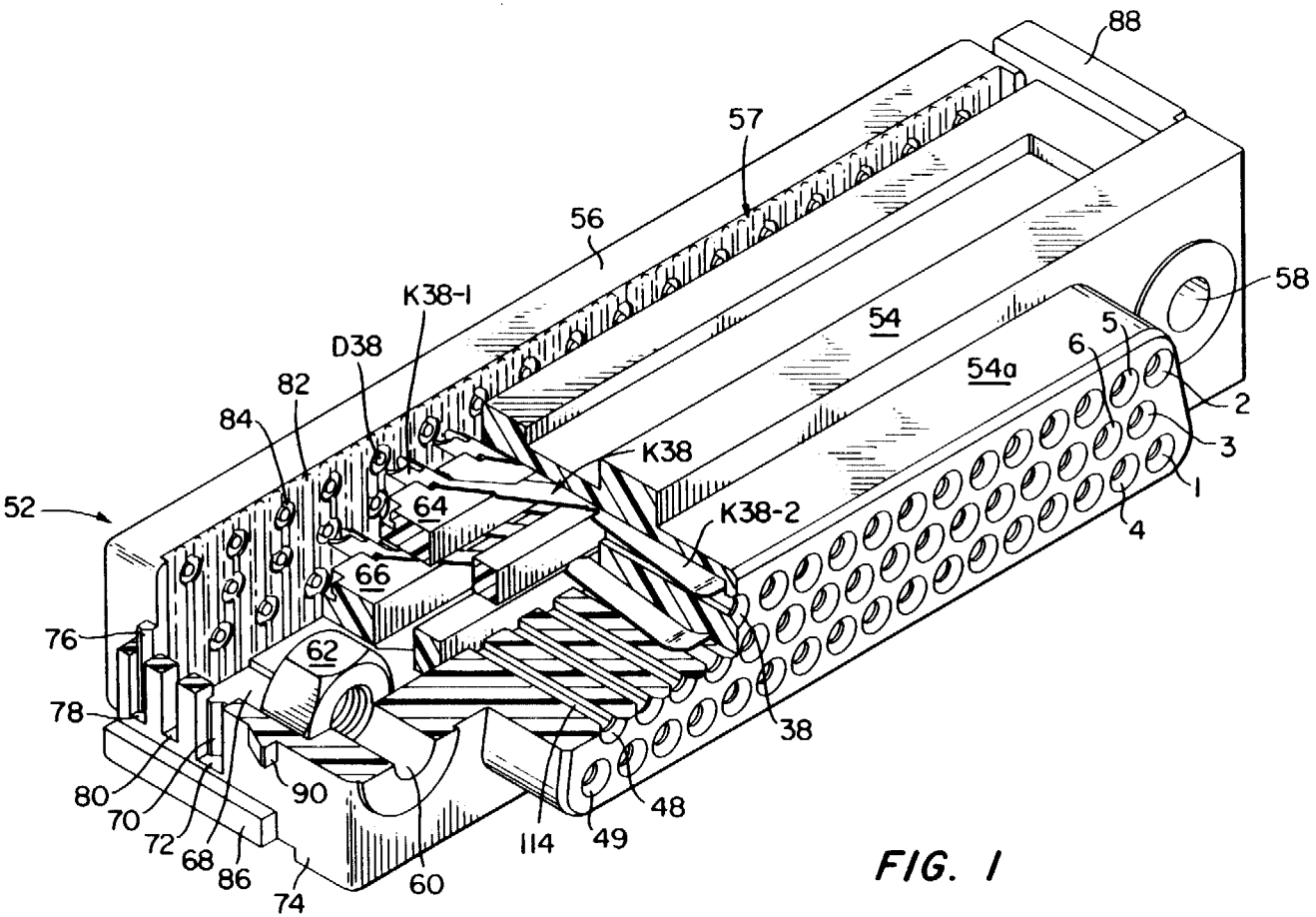
FIG. 1 is a perspective view of a connector in accordance with the invention, partly cut away to show interior detail.
Figure 12:
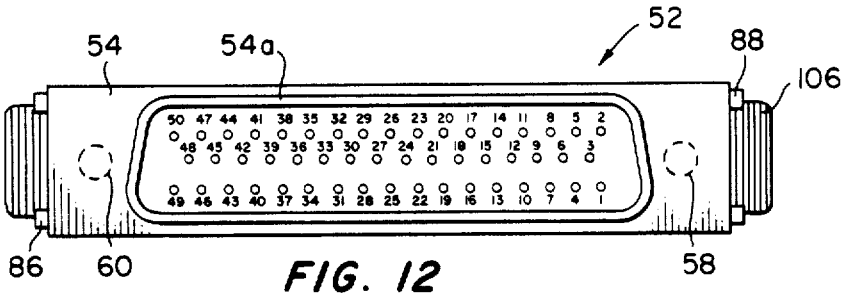
FIG. 12 is a bottom view of the FIG. 9 connector.

Referring to FIGS. 1 and 12, connector 52 includes a housing 54 having a base 54a of trapezoidal outline, commonly referred to as being of D-configuration, and defining a plurality of openings 1–50 in layout pattern presently widespread in the electronics industry. As noted completely in FIG. 12, and in part in FIG. 1, the lowermost row of holes includes holes 1, 4, 7, through in such sequence to hole 49. The second row includes holes 3, 6, etc., through to hole 48 and the third or uppermost row includes holes 2, 5, etc., through to hole 50. Considering base 54a to be elongate and to have a longitudinal axis in registry with the middle row of holes, it will be seen that holes 1 and 2 are each laterally opposed across such longitudinal axis, as are holes 4 and 5. For pattern definition purposes, it may be said, as respects the outermost rows, that they have laterally opposed holes defining a pair of holes which occupy corresponding row positions, and that pairs of such holes are in mutually longitudinally spaced relation in such dedicated pattern. As for the middle row of holes, it will be observed that this set of holes is in centrally staggered longitudinal relation to the outermost rows. Thus, the spacing between longitudinally adjacent holes in any row is of one given pitch. The spacing between longitudinally adjacent holes of the middle row with respect to each of the outer rows is one-half of such given pitch.

Connector 52 further includes cover 56 which defines with housing 54 a longitudinal channel 57 through which a flat multiconductor cable may be inserted in the connector for termination. Openings 58 and 60 are arranged longitudinally outward of base 54a, for purposes of joining connector 52 with a complemental housing supporting pins in pattern corresponding to holes 1–50. Typically, such complemental housing includes facility for presenting screws or the like for securement purposes. In the arrangement of FIG. 1, connector 52 has its interior parts so configured as to provide for containment of nut 62 or like threaded member, the same being entrapped in registry with opening 60. Such interior parts of connector 52 include contact support members or inserts 64, 66 and 68. Each of these members is configured to support a set of contact elements, as is discussed more fully below, and has an extending tongue at each sideward end thereof, e.g., tongue 70 of insert 68 in FIG. 1, which is interfittable in a slot, e.g., slot 72 of sidewall 74 in FIG. 1, for retention of the support member in housing 54. Likewise, cover 56 includes tongue 76 which is detentable in slot 78. In this position, cover 56 defines open channel 57 for receiving the flat cable and is retained in tightly engaging relation to the cable following insulation-displacement connection, by interfitting of tongue 76 in the lower slot 80 in sidewall 74. In its interior surface, cover 56 is ribbed, as at 82, and also defines dimples D, each surrounded by annular recess 84 in registry with each of the contact elements of connector 52. Exteriorly of its sidewalls, connector 52 includes guide rails, 86 and 88 being shown in FIG. 1, for receiving a cable strain relief member discussed below and detentable with tongue 90.

Figure 2:
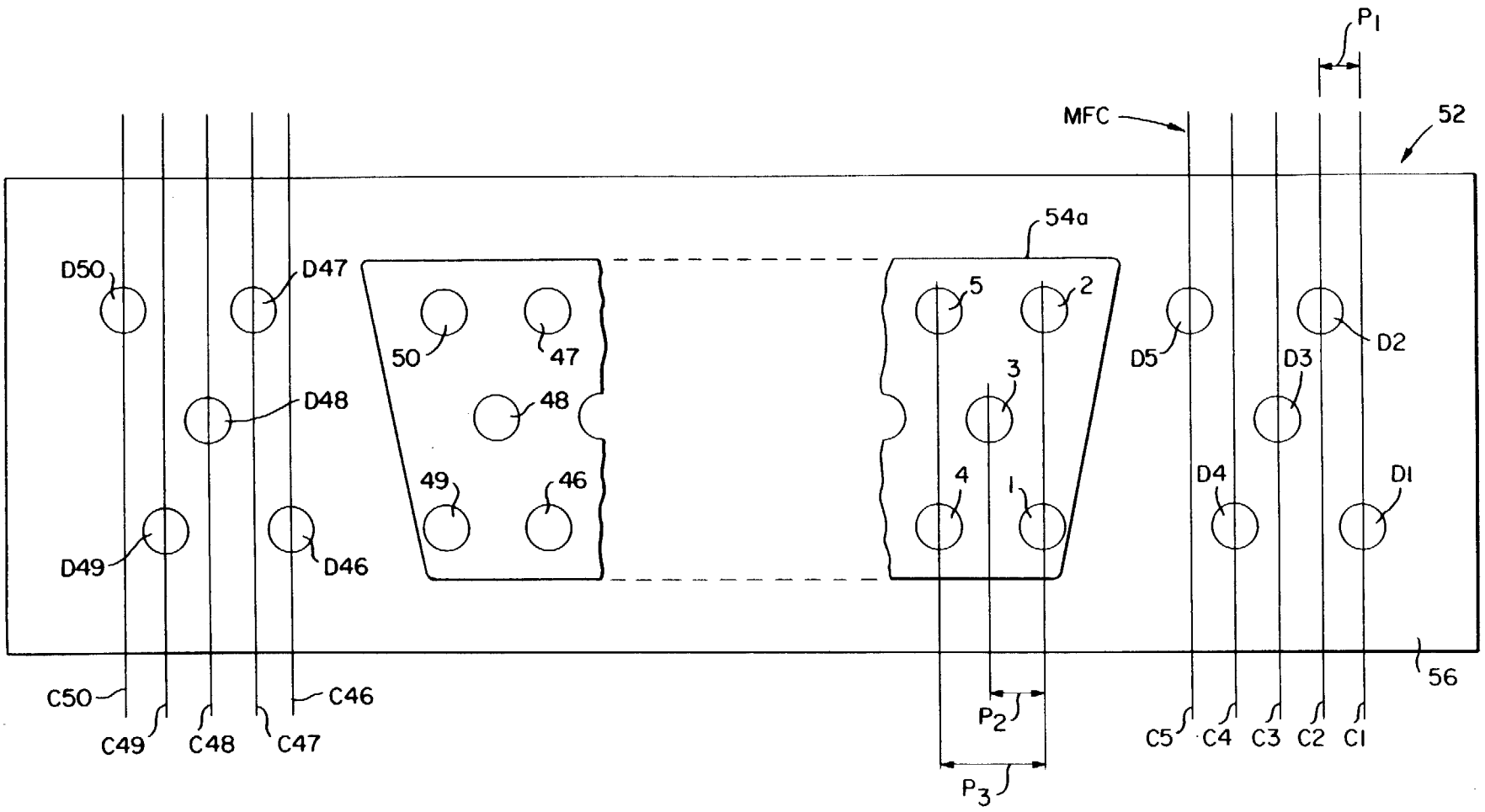
FIG. 2 is a schematic diagram illustrating the geometric relationship between the FIG. 1 connector base and flat multiconductor cable.

Referring now to FIG. 2, multiconductor flat cable MFC is illustrated schematically in mass-terminated relation to connector 52, rightwardly in FIG. 2, the cable is illustrated as having conductors C1–C5 in registry with dimples D1–D5 of cover 56. All conductors are on the same pitch, as indicated by measure $P_1$, typically 0.050 inch. Conductors C1–C5 are longitudinally outboard of corresponding holes 1–5 of connector base 54a. Turning to the leftward side of FIG. 2, conductors C46–C50 of cable MFC are longitudinally outward of holes 46–50 of the connector. FIG. 2 also indicates the spacing between longitudinally adjacent holes, e.g., hole 3 to holes 2 or 1 to be in pitch $P_2$, whereas the spacing between longitudinally adjacent holes in any given one of the three rows of holes, e.g., the spacing between holes 1 and 4, is in measure or pitch $P_3$. Typically, the pitch $P_2$ is 0.0545 inch and the pitch $P_3$ is 0.109 inch. As there are seventeen holes in the outer-most rows of base 54a, and thus sixteen spaces of pitch $P_3$, the overall longitudinal length of the hole pattern is sixteen times $P_3$, in the typical example 1.744 inches. The overall lengthwise extent of the flat cable is forty-nine times pitch $P_1$, in the typical example 2.45 inches. In providing for electrical interconnection of accessory apparatus pins which might be inserted in the holes of base 54a and the individual conductors of cable MFC, Applicant assigns contact elements of configuration extending between correspondingly numbered holes and conductors in registry with correspondingly numbered dimples. Thus, as will be made more succinct by upcoming discussion of FIGS. 3–5, Applicant assigns a first contact element for transition between hole 1 and dimple D1, a second contact element for transition between hole 2 and dimple D2, etc.

Figure 3:
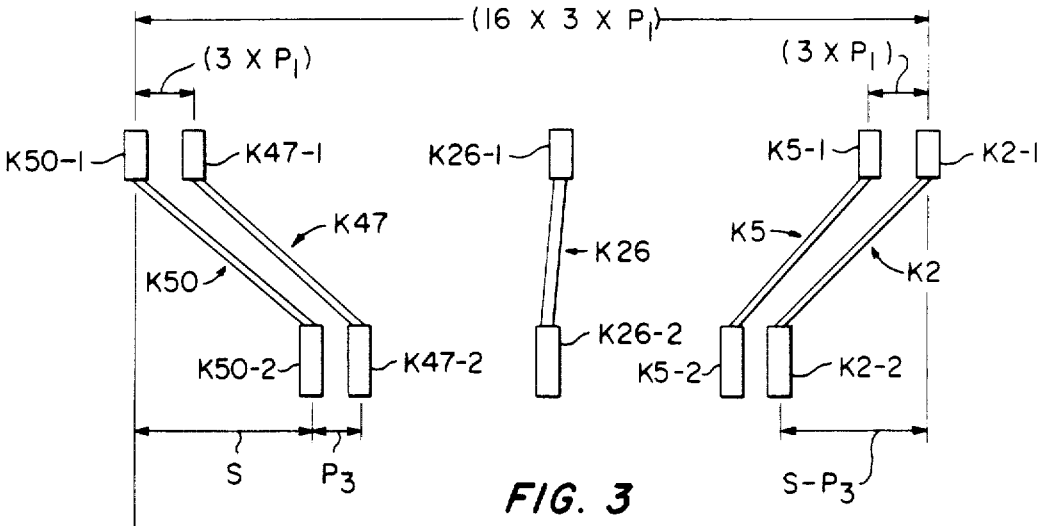
FIGS. 3–5 are schematic diagrams illustrating the longitudinal configurations of contact element sets in the FIG. 1 connector.

Turning now to FIG. 3, the set of contact elements for the uppermost row of the FIG. 1 connector is illustrated in part as comprising rightward contact elements K2 and K5, central contact element K26 and leftward contact elements K47 and K50. Considering contact element K2 as typical of all of the contact elements, same includes opposed first and second terminal or end portions K2-1 and K2-2 and a central section connecting the two end portions and having varying inclination or attitude as shown in FIG. 3. First end portion K2-1 is of insulation-piercing type and will be in registry with dimple D2 (FIG. 2). Second end portion K2-2 may be of blade, pin, or socket configuration and will be in registry with hole 2 (FIG. 1). In order that all such first end portions are in registry with the dimples in the upper row of FIG. 2, i.e., that they are mutually spaced by three times $P_1$ distance, they are arranged at such thrice multiple of pitch $P_1$. Likewise, in order that the second end portions be in registry with the holes in the uppermost row of FIG. 2, same are mutually spaced by pitch $P_3$. An asymmetrical character attends the contact element layout. Thus, as will be seen in FIG. 3, second end portion K50-2 is longitudinally spaced from first end portion K50-1 by distance S. On the other hand, second end portion K2-2 is longitudinally spaced from first end portion K2-1 by the measure $S\text{-}P_3$.

Figure 4:
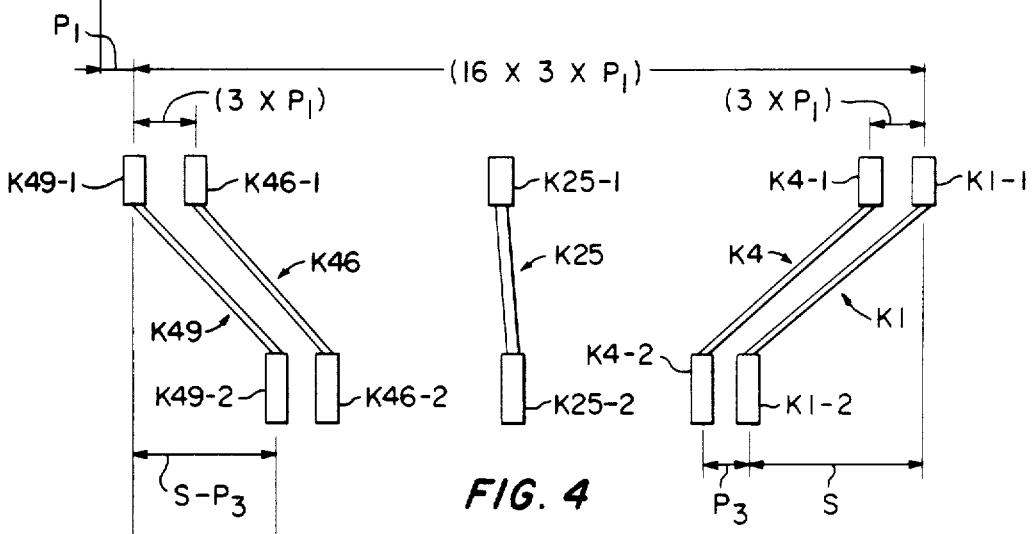

The set of contact elements for use in providing transition from the bottom row of holes in FIG. 2 to the dimples longitudinally aligned therewith is shown in FIG. 4. As required by the dedicated pattern, contact element second end portion K49-2 is in longitudinal registry with second end portion K50-2 of FIG. 3. The second end portions are again spaced by the pitch $P_3$, such that the opposed pairs of second end portions are in longitudinal registry throughout, e.g., end portions K2-2 and K1-2, K5-2 and K4-2, etc. The asymmetry aspect of the contact set of FIG. 4 is the reverse of that of FIG. 3. The leftwardmost second end portion K49-2 is now spaced from first end portion K49-1 by the measure $S\text{-}P_3$. The rightwardmost second end portion K1-2 is, on the other hand, spaced from first end portion K1-1 by the distance S. The mirror-image relation between the contact sets of FIGS. 3 and 4 will be seen particularly by observing the central contact elements K25 and K26. Thus, second end portions K25-2 and K26-2 are in longitudinal registry, their central portions have opposite inclination and their first end portions K25-1 and K26-1 are in different longitudinal positions. The spacing longitudinally between first end portions K25-1 and K26-1 is of measure $P_1$, as is the case between leftward first end portions K49-1 and K50-1.

Figure 5:
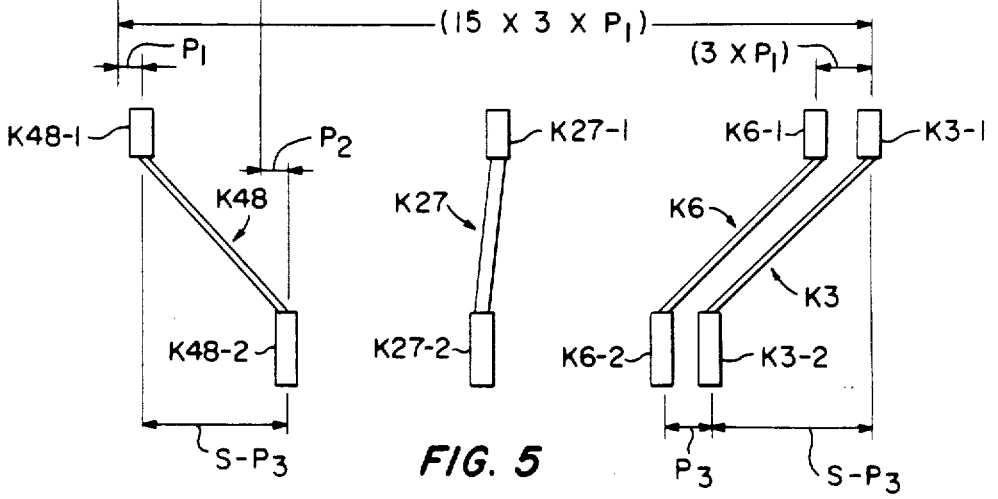

Considering the contact element set of FIG. 5, same is for use in the central row of FIG. 2, for transition between hole 3 and dimple D3, etc. Here, the contact element first portions are offset longitudinally by the measure $P_1$ from corresponding first end portions of the FIG. 4 contact set. This provides for unique disposition, as against the contact element sets of FIG. 3 and FIG. 4, of illustrated FIG. 5 first end portions K3-1, K6-1, K27-1, and K48-1. Second end portions in FIG. 5 are likewise offset from second end portions in FIG. 4 by the measure $P_2$, providing the staggering between the second row contacts and those of the outer rows. In contrast to the contact element sets of FIGS. 3 and 4, the FIG. 5 contact element set has one less contact element, i.e., sixteen as opposed to seventeen, and does not have the asymmetry of either of the first-discussed sets. Thus, leftward first end portion K48-2 is spaced from first end portion K48-1 by the distance S-$P_3$, as is the case with the rightwardmost contact element K3, whose first end portion K3-1 is spaced from its second end portion K3-2 by the measure S-$P_3$.

Figure 6:
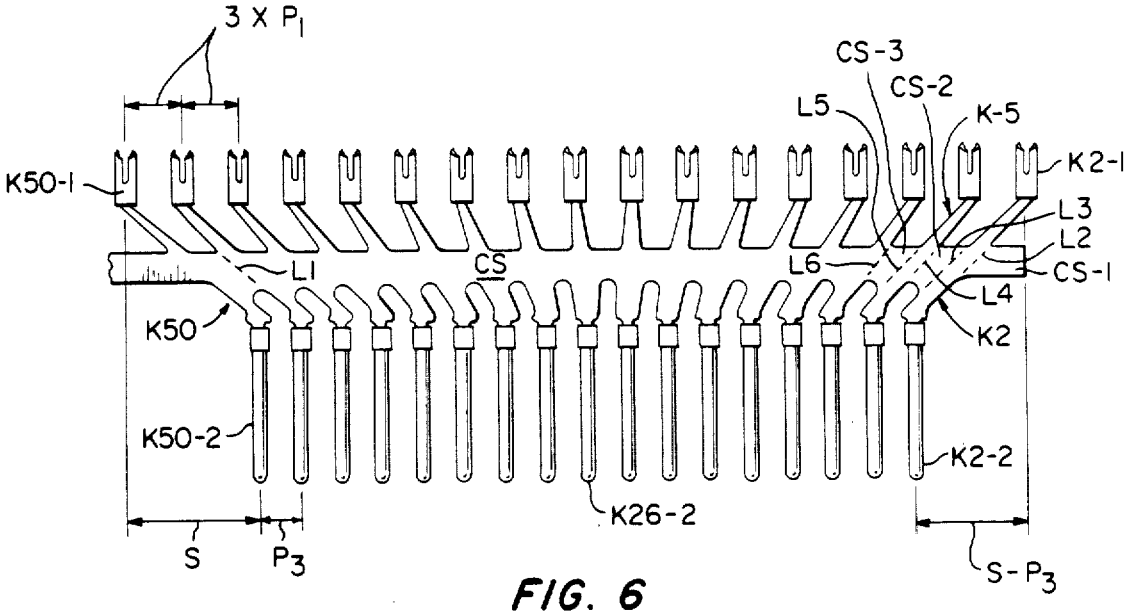
FIG. 6 is a front elevation of a contact element strip for use in practicing the method of the invention.

In fabricating the contact element sets of FIGS. 3-5, a method of the invention permits the use of a common starting contact element set, depicted in FIG. 6. Carrier strip CS is disposed between contact element first end portions and second end portions and supports the contact element set for cutting operations discussed below. Geometry of the common contact element set, as viewed in FIG. 6, is that of the asymmetric contact element set of FIG. 3. If one now takes this common contact element set and rotates it about an axis centrally of second end portion K26-2 for one-half revolution (180 degrees), a contact element set having the geometry of the FIG. 4 asymmetric contact element set is provided. Further, if one removes from FIG. 6 all structure leftward of line L1 i.e., contact element K50 and associated carrier strip material, one reaches the geometry of the FIG. 5 contact element set.

Figure 7:
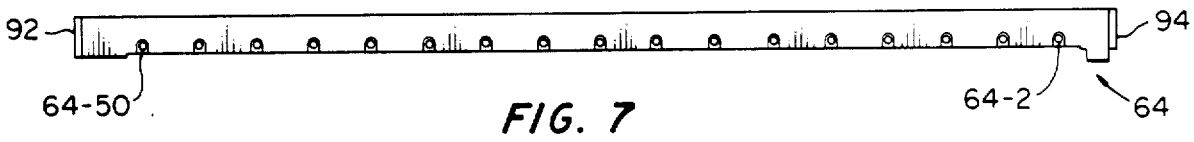
FIG. 7 is a plan elevation of a contact set support member.
Figure 8:
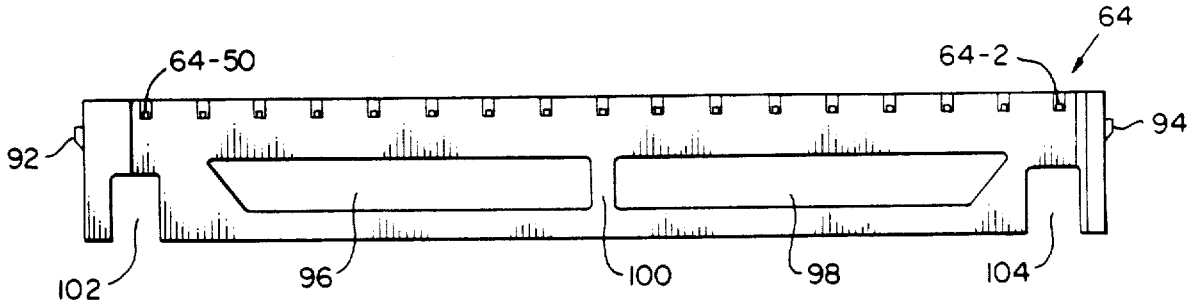
FIG. 8 is a front elevation of the FIG. 7 support member.

In forming the FIG. 6 carrier strip and contact element end portions, a metal stamping may be provided in the geometric arrangement of FIG. 6 with the upper (first) contact end portions being rolled from flat configuration into generally cylindrical shape with appropriate insulation-piercing and -displacing edges and slots. The lower (second) contact end portions may be provided in blade-like form and suitably spring-biased to provide for resilient engagement with accessory apparatus in the form of pins or the like. Thus formed, the FIG. 6 contact element set is placed on contact support member or insert 64, shown in FIGS. 7 and 8. The individual contact element first end portions are nested in slots, e.g., 64-2 through 64-50, and are retained by interference fit therein. Cutting access openings 96 and 98 are provided adjacent center support member post 100. With this assembly completed, one now selectively cuts carrier strip CS as exposed through openings 96 and 98 to provide individual electrical isolation of contact elements. Referring back to FIG. 6, one cuts along lines L2 and L3 to define contact element K2, carrier strip material CS-1 being removed in the process. Cutting is performed further on lines L4 and L5, providing for the removal of carrier strip material CS-2 and partial formation of contact element K5. Cutting is then performed along line L6, with the removal of carrier strip material CS-3. Upon continuation and completion of such cutting away activity, one is provided with the contact elements in required configurations and supported on one of the support members 64–68 (FIG. 1). Each of such support members includes sideward lower recesses, recesses 102 and 104 being shown in FIG. 8 for support member 64. The recesses of the several contact members are spatially in registry at each side thereof to collectively define an opening for the receipt and retention of nut 62 (FIG. 1) and its counterpart right side nut (not shown). Tongues 92 and 94 of support member 64 are interfittable with slot 72 (FIG. 1) for retention of the support member in housing 54.

Figure 10:
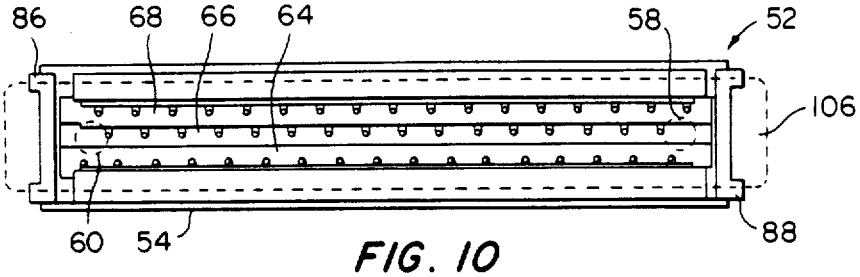
FIG. 10 is a plan elevation of the FIG. 9 connector with the strain relief member and cover removed and shown in phantom outline.
Figure 9:
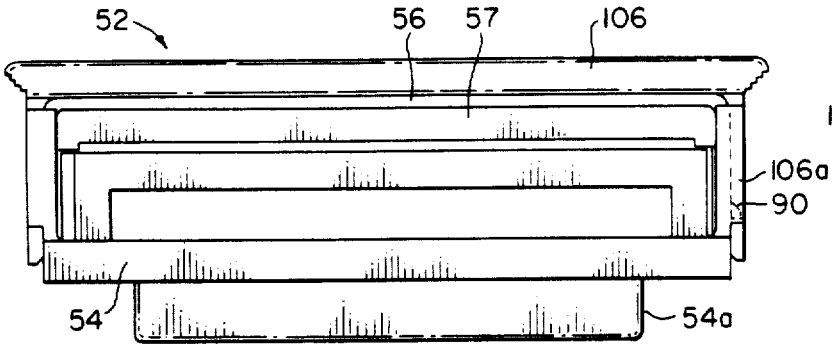
FIG. 9 is a front elevation of the FIG. 1 connector, inclusive of a strain relief member.
Figure 11:
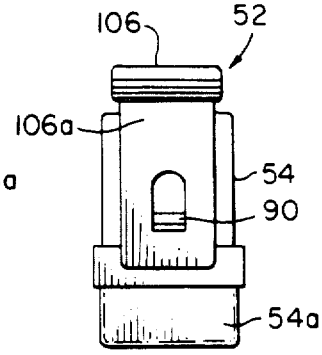
FIG. 11 is a side elevation of the FIG. 9 connector.
Figure 13:
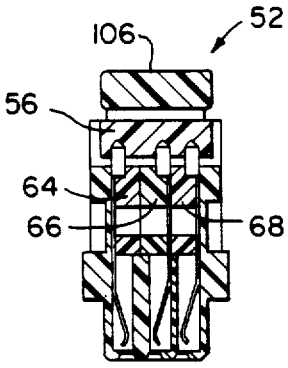
FIG. 13 is a typical sectional view of the FIG. 9 connector.

Referring now to FIGS. 9–12, connector 52 is shown inclusive of a strain relief member 106 adapted to provide strain relief for a terminated cable. The cable is not shown in these figures, but would if present be disposed in longitudinal channel 57 (FIG. 9). Cover 56 is shown in FIG. 9 in its cable-receiving position and is movable downwardly from such position to force the cable into insulation-pierced termination by the upper (first) contact element end portions. The terminated cable may then be routed between the cover and member 106 and member 106 then arranged in downward position, i.e., with its sidewall 106a in latched relation to tongue 90 of housing 54. In FIG. 10, the connector is shown with its cover in phantom outline, whereby the orientation of contact support members 64, 66 and 68 may be observed. Support member 66 and 68 support their contact elements on the upward sides thereof, whereas support member 64 supports its contact elements on the downward side thereof. This arrangement is further illustrated in the typical sectional view in FIG. 13.

Figure 14:
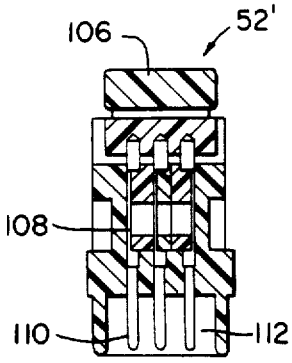
FIG. 14 is a typical sectional view of a further connector according with the invention.

A typical sectional view is shown in FIG. 14 of connector 52′, which is of like configuration to connector 52, but its contact elements 108 have lower (second) end portions providing connection terminals in the form of pins 110, as contrasted with the blade members defining the lower end portions of contact elements of connector 52. A suitable recess 112 is provided for the receipt of a socket-type base on accessory apparatus adapted for connection with connector 52′.

In the case of the blade-like lower (second) contact element, as is shown in FIG. 1 for contact K38, its lower end portion K38-2 is biased against side-wall of access channel 114 formed in base 54a.

In summary of the disclosed method of the invention, a plurality of identical elongate contact strips is formed, each strip having a continuous central longitudinal extent and first and second laterally opposed contact element end portions extending therefrom. Longitudinal asymmetry exists as between the ends of each strip. In the particularized embodiments, such longitudinal asymmetry is obtained by providing different longitudinal spacings between contact element first and second end portions at opposite ends of the strip, i.e., longitudinal spacing S at the leftward end of the FIG. 3 strip and longitudinal spacing S-$P_3$ at the rightward end of the FIG. 3 arrangement. Two such formed strips are disposed in facing relation with facing second contact end portions thereof in longitudinal registry. This defines, in the particularized embodiment, the outer rows of contacts. The third row contacts are provided by rendering a third such formed strip longitudinally symmetric as between the ends thereof, e.g., by removing therefrom the contact element first and second end portions disposed at one strip end. In the particularized example, one removes contact element K50 from the FIG. 3 arrangement. The method is then practiced by disposing the third formed strip in intervening facing relation to the outer row strips with the contact element second end portions of the intervening strip longitudinally staggered with respect to the second end portions of the outer strips. In the course of practice of the method, the carrier strip material is removed to provide electrical independence for each of the contact elements in the sets.

While the invention has been described by way of preferred embodiments and practices, various changes or modifications thereto will be now evident to those skilled in the art. Accordingly, the preferred embodiments and practices are intended in an illustrative and not in a limiting sense. The true spirit and scope of the invention is set forth in the following claims.

I claim:

1. An electrical connector for insulation-piercing termination of flat multiconductor cable, said connector comprising an elongate housing supporting electrical contact elements in at least first, second and third laterally spaced parallel rows, each said contact element including a first end portion of insulation-piercing type and a second end portion, laterally opposite ones of said second end portions in said first and third rows being in corresponding first longitudinal positions, said second end portions in said second row being in second longitudinal positions different from said first positions, all of said first end portions being in non-corresponding longitudinal positions.

2. The connector claimed in claim 1 including a unitary cover supported by said housing in facing relation to said contact first end portions.

3. The connector claimed in claim 1 wherein said second end portions of said contact elements in said second row are staggered longitudinally with respect to said second end portions of said contact elements in said first and third rows.

4. The connector claimed in claim 1 wherein the spacing between longitudinally successive of such second end portions differs from the spacing between longitudinally successive of such first end portions.

5. The connector claimed in claim 1 wherein each said contact element second end portion constitutes a connection terminal.

6. The connector claimed in claim 5 wherein each said contact element second end portion comprises a blade member, said housing defining a pin-receiving channel communicating with each such blade member.

7. The connector claimed in claim 1 further comprising first, second and third insert members respectively for supporting said first, second and third rows of contact elements.

8. The invention claimed in claim 7 wherein said housing and said insert members have cooperative latch means for retaining said insert members in said housing.

9. The invention claimed in claim 1 further comprising securement means supported fully interiorly of said housing and accessible exteriorly of said housing for securing said connector to accessory apparatus.

10. The connector claimed in claim 9 wherein said securement means comprises threaded means disposed longitudinally outwardly of said contact element second portions.

11. An electrical connector for insulation-piercing termination of flat multiconductor cable, said connector comprising an elongate housing and electrical contact elements supported in said housing in first and second laterally spaced parallel rows, each said contact element comprising a member integrally defining opposed first and second end portions, said first end portions being of insulation-piercing type, there being different spacings in said first row between the first and second end portions of contact elements at opposite ends of said first row defining thereby a configuration of said first row asymmetrical at said opposed ends thereof, the configuration of said first row being the mirror-image of the configuration of said second row, *said first and second contact element rows having respective corresponding contact elements, corresponding laterally opposed second end portions thereof being in corresponding row positions, said connector including further such contact elements supported in said housing in a third longitudinally extending row, laterally between said first and second rows and parallel therewith, said first end portions of contact elements of said first, second and third rows being in different longitudinal positions.*

[12. The connector claimed in claim 11 wherein said first and second contact element rows have respective corresponding contact elements and wherein corresponding laterally opposed second end portions thereof are in corresponding row positions.]

[13. The connector claimed in claim 12 wherein all first end portions of contact elements of both said first and second rows are in different longitudinal positions.]

[14. The connector claimed in claim 13 comprising further such contact elements supported in said housing in a third longitudinally extending row, laterally between said first and second rows.]

15. The connector claimed in claim [14] *11* wherein second end portions of contact elements in said third row are staggered longitudinally with respect to second end portions of contact elements in said first and second rows.

16. The connector claimed in claim 15 wherein the spacing between longitudinally successive of such second end portions differs from the spacing between longitudinally successive of such first end portions.

17. The connector claimed in claim 11 wherein each said contact element second end portion constitutes a connection terminal.

18. The connector claimed in claim 17 wherein each said contact element second end portion comprises a blade member, said housing defining a pin-receiving channel communicating with each such blade member.

19. The connector claimed in claim [14] *11* further comprising first, second and third insert members respectively for supporting said first, second and third rows of contact elements.

20. The invention claimed in claim 19 wherein said housing and said insert members have cooperative latch means for retaining said insert members in said housing.

21. The invention claimed in claim 11 further comprising securement means supported fully interiorly of said housing and accessible exteriorly of said housing for securing said connector to accessory apparatus.

22. The connector claimed in claim 21 wherein said securement means comprises threaded means disposed longitudinally outwardly of said contact element second portions.

[23. An electrical connector for insulation-piercing termination of flat multiconductor cable, said connector comprising an elongate housing and electrical contact elements supported in said housing in first and second laterally spaced parallel rows, each said contact element comprising a member integrally defining opposed first and second end portions, said first end portions being of insulation-piercing type, a central section of predetermined inclination extending between said first and second end portions of each contact element of said first and second rows, at least one pair of contact elements of said first and second rows having corresponding laterally opposed second end portions in corresponding row positions and having respective first end portions in different longitudinal positions, the central portions of each of said contact elements of such pair having respectively opposite sense inclinations.]

[24. An electrical connector for insulation-piercing termination of flat multiconductor cable, said connector comprising an elongate housing and electrical contact elements supported in said housing in first and second laterally spaced parallel rows of equal numbers of contact elements, each said contact element comprising a member integrally defining opposed first and second end portions, said first end portions being of insulation-piercing type, at least one contact element in each of said rows being different in configuration from another contact element within the respective same row of contact elements, the second end portions of the contact elements of said first row being in corresponding row positions with second end portions of the second row, the configuration of said first row being the reverse of the configuration of said second row.]

*25. The connector claimed in claim 11 wherein the longitudinal configuration of said third row contact elements is identical to the longitudinal configuration of said first row contact elements, except for the absence from said third row contact elements of one of said contact elements at one of said opposite ends of said first row.*

*26. The connector claimed in claim 11 wherein the longitudinal succession of first end portions of said contact elements is in an order repetitively defined by a first row contact element, then a second row contact element and then a third row contact element.*

*27. The connector claimed in claim 11 wherein the longitudinal spacing between each first row contact element first end portion and the longitudinally successive second row contact element first end portion is substantially equal to the pitch of said cable.*

*28. The connector claimed in claim 11 wherein the longitudinal spacing between each second row contact element first end portion and the longitudinally successive third row contact element first end portion is substantially equal to the pitch of said cable.*

*29. The connector claimed in claim 11 wherein the longitudinal spacing between each first row contact element first end portion and the longitudinally successive third row contact element first end portion is substantially equal to twice the pitch of said cable.*

*30. The connector claimed in claim 19 wherein a longitudinal succession of three such contact element first end portions is provided by contact elements supported respectively in order by said first, second and third insert members.*

* * * * *